(No Model.)
L. S. HEALD.
ROTARY CUTTER.
No. 567,135. Patented Sept. 8, 1896.
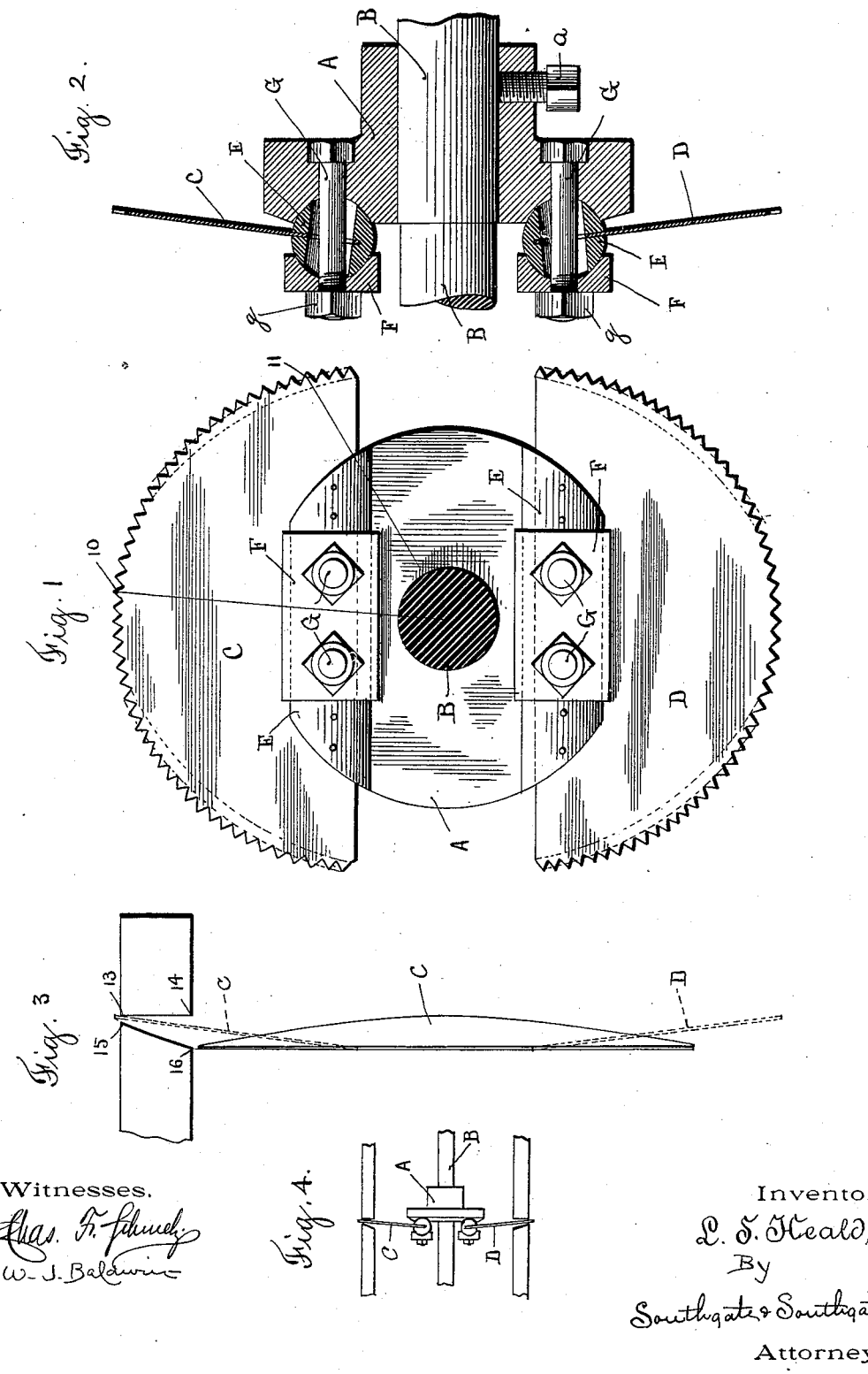
Witnesses.
Chas. F. Schmelz
W. J. Baldwin
Inventor.
L. S. Heald,
By
Southgate & Southgate
Attorneys

UNITED STATES PATENT OFFICE.

LEANDER S. HEALD, OF BARRE, MASSACHUSETTS.

ROTARY CUTTER.

SPECIFICATION forming part of Letters Patent No. 567,135, dated September 8, 1896.

Application filed October 11, 1895. Serial No. 565,365. (No model.)

*To all whom it may concern:*

Be it known that I, LEANDER S. HEALD, a citizen of the United States, residing at Barre, in the county of Worcester and State of Massachusetts, have invented a new and useful Improvement in Rotary Cutters, of which the following is a specification.

The object of my invention is to provide a rotary cutter for beveling or sawing boards at an incline.

To these ends my invention consists of the parts and combinations of parts as hereinafter described, and more particularly pointed out in the claims at the end of this specification.

In the accompanying drawings, Figure 1 is a side elevation of a rotary cutter constructed according to my invention. Fig. 2 is a sectional view of the same. Fig. 3 is a diagrammatic view illustrating the operation of the device, and Fig. 4 is a diagrammatic view illustrating a further application of my improved cutter.

A rotary cutter constructed according to my invention consists, essentially, of an inclined or wabbling disk-shaped or partial disk-shaped saw, which is arranged eccentrically with respect to its axis of rotation.

In the drawings I have illustrated a cutter comprising two counterbalancing inclined or wabbling saws, which are arranged eccentrically with respect to a common axis of rotation. It is obvious, however, that a single saw can be employed if desired.

Referring to the drawings and in detail, A designates a hub or collar, which may be clamped upon a shaft B, as by means of a set-screw $a$. A pair of counterbalancing segmental-shaped saws C and D are provided on their inner edges with substantially concentric strips E. The strips E are adapted to fit into transverse grooves in the face of the hub A, and the parts may be adjustably secured together by means of the clamping-strips F, the clamping-bolts G, and the nuts $g$. By means of this construction it will be seen that the segmental-shaped saws C and D may be adjustably secured at any desired inclination with respect to the shaft B.

The operation of a cutter as thus constructed is most clearly illustrated in Figs. 1 and 3. Referring to these figures, it will be seen that each individual tooth of each saw will describe a circle about the shaft B, and the teeth near the ends of the saw, being nearer the shaft B, will describe smaller circles than the teeth near the center of the saw. For instance, the tooth 11, as illustrated in Fig. 1, will travel in a circle which is considerably smaller than the circle described by the tooth 10 near the center of the saw. At the same time the plane of rotation of the teeth near the center of the saw will be a short distance to the left, as illustrated in Fig. 3, from the plane of rotation of the teeth near the ends of the saw.

In Fig. 3 I have illustrated the relation of the parts when a rotary cutter constructed according to my invention is employed in the ordinary saw-table. By reference to this figure it will be seen that the cutter will make a substantially wedge-shaped or tapering cut in the material which is operated upon. As illustrated, one side of the cut, as 13 14, will be formed by the action of the teeth near the middle of the saws, and hence will be substantially straight. The opposite side of the cut 15 16 will be formed by the successive action of all the various teeth which extend up into position to engage with the material acted upon. When the inclined eccentric saws C and D have substantially the form of segments of a circle, it is to be noted that the inclined side of the cut 15 16 formed thereby will be slightly grooved or hollowing, as illustrated in Fig. 3. Where rotary cutters constructed according to my invention are used on cuts or work which require a comparatively small taper, I have found in practice that the slight curvature or hollowing on the side of the cut 15 16 may be disregarded. If it is desired, however, to produce a cut which is mathematically accurate, I may employ eccentric offset saws, which are made substantially in the form of segments of ellipses, as indicated by dotted lines in Fig. 1. It is obvious, however, that to produce mathematically-correct results the elliptical saws C and D would have to be of a slightly-different curvature to correspond with the different inclinations at which they are set with respect to their axis of rotation. While saws of this character may be employed with advantage in certain classes of work, the results obtained by circular saws, or saws having the forms of segments of circles, have been found to be sufficiently accurate for all practical purposes.

While rotary cutters or saws constructed according to my invention may be employed with advantage on many different classes of work, I have found that they are of especial advantage in beveling the lower ends of the side boards of window-casings. Each window-casing, as ordinarily constructed, comprises a pair of outside facings or side boards which should be made to exactly correspond with each other. When a cutter constructed according to my invention is employed to bevel the lower ends of these facings, it is desirable to mount the cutter so that it may act simultaneously upon two such planks or boards.

In Fig. 4 I have illustrated diagrammatically the relative position of the parts for accomplishing this purpose, and in practice I have introduced cutters constructed according to my invention, and have employed the same with advantage in connection with the machine which is illustrated in the United States Letters Patent No. 547,991, granted to L. S. and J. N. Heald, October 15, 1895.

I am aware that many changes may be made in the construction of a rotary cutter by those who are skilled in the art without departing from the scope of my invention as expressed in the claims, and that different means may be adopted for adjusting the inclination of the saws. I do not wish, therefore, to be limited to the exact form which I have shown and described, but What I do claim, and desire to secure by Letters Patent of the United States, is—

1. In a device of the class described, the combination of a shaft or arbor, a flat disk-shaped or partial disk-shaped saw arranged eccentrically with respect to said arbor, and means for securing the saw at different inclinations with respect to its arbor, whereby the saw may be adjusted to make a wedge-shaped cut, one side of said cut being perpendicular to the shaft or arbor, and the other side of said cut being inclined, substantially as described.

2. The combination of a shaft or arbor, a pair of counterbalancing, partial disk-shaped saws arranged eccentrically with respect to said arbor, and an adjustable clamping device for securing said saws at different inclinations with respect to their arbor, substantially as described.

3. The combination of a hub, a pair of counterbalancing saws, strips secured to said saws and fitting into grooves in said hub and bolts and clamping-strips for adjustably securing the saws in inclined positions, substantially as described.

In testimony whereof I have hereunto set my hand in the presence of two subscribing witnesses.

LEANDER S. HEALD.

Witnesses:
CLINTON C. COOK,
JAMES N. HEALD.